United States Patent [19]

Knoski

[11] 4,225,191
[45] Sep. 30, 1980

[54] QUICK CHANGE WHEEL ASSEMBLY

[76] Inventor: Jerry L. Knoski, 1695 Emerald Ct., Newark, Ohio 43055

[21] Appl. No.: 24,913

[22] Filed: Mar. 29, 1979

[51] Int. Cl.³ .............................................. B60B 3/16
[52] U.S. Cl. ................................. 301/9 DN; 301/5 R; 301/63 PW; 403/12; 403/13
[58] Field of Search .............. 301/5 R, 9 DN, 9 AN, 301/9 DP, 9 SB, 63 R, 63 PW; 403/12-14; 279/1 M

[56] References Cited

U.S. PATENT DOCUMENTS

| | | | |
|---|---|---|---|
| 1,380,925 | 6/1921 | Putnam | 301/9 DN X |
| 2,107,925 | 2/1938 | Ash | 301/9 DN X |
| 2,640,729 | 6/1953 | Niven | 301/9 DN |
| 2,925,304 | 2/1960 | Hykes | 301/9 DN |

FOREIGN PATENT DOCUMENTS 2305531  8/1973  Fed. Rep. of Germany ....... 301/9 DN

*Primary Examiner*—Charles A. Marmor
*Attorney, Agent, or Firm*—Joseph E. Rusz; Arsen Tashjian

[57] ABSTRACT

A demountable wheel assembly for a vehicle which comprises an axle-retained wheel hub and a wheel, on which a tire is mounted, which are quickly releasably connectable to, or separable from each other, even by the weak, the aged, and the handicapped. Guide pins on the wheel hub align the tire mounted-wheel, while exposed permanent magnets partially embedded in the wheel hub draw and hold the wheel, thereby freeing the hands. Headless bolts are driven by a brace-shaped driver through threaded bolt nuts that are partially embedded in the wheel; through threaded, tapered extensions behind the nuts; and into threaded, tapered cavities in the wheel hub. Overtightening of the bolts is prevented by the short-span of the bolt driver.

6 Claims, 4 Drawing Figures

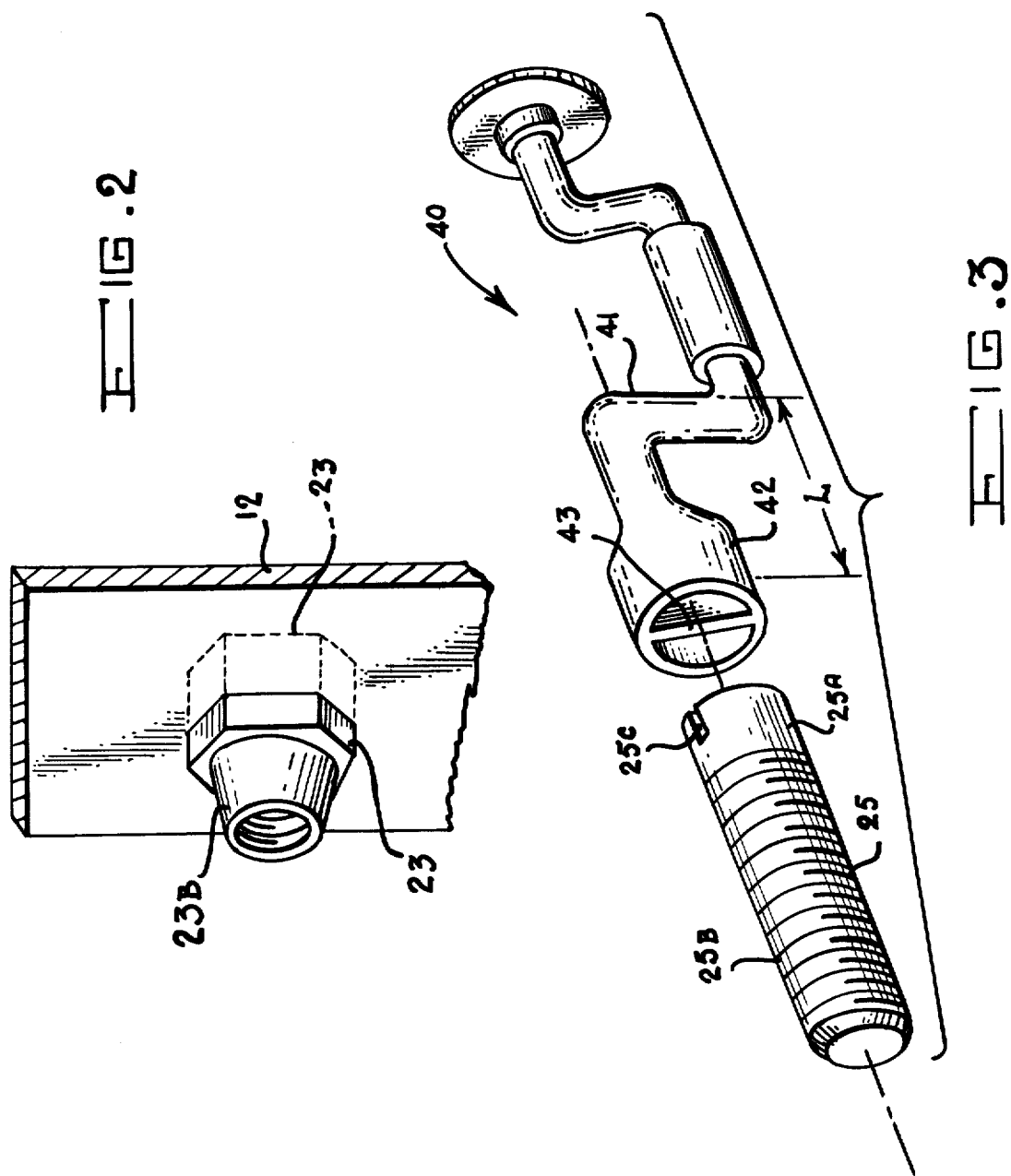

QUICK CHANGE WHEEL ASSEMBLY

STATEMENT OF GOVERNMENT INTEREST

The invention described herein may be manufactured and used by or for the Government for governmental purposes without the payment of any royalty thereon.

CROSS REFERENCE TO RELATED APPLICATION

The tapered guide pins used herein, such as 31 and 32, FIG. 1, are similar to the guide pins disclosed in my co-pending patent application entitled, "Easy Change Wheel Assembly".

BACKGROUND OF THE INVENTION

This invention relates generally to the wheel art and, more particularly, to a quick change wheel assembly for a wheeled vehicle.

The current method of mounting a tire-mounted wheel (or "rim") on an automobile, truck or other vehicle concludes with the step of tightening nuts on lugs (or studs) not only to assure that the wheel is secured to the lugs, but also to assure that the wheel does not wobble, even if secure. Nevertheless, there is the well known tendency of overtightening for an added measure of security, thereby creating the future problem of untightening. This problem is compounded with the advent of power driven impact tools which invariably are used in garages and service stations to speed up the wheel change process. The net effect is that most lug nuts are fastened too tightly to be loosened by the aged, the handicapped, the weakened, and by the average female. Further, the reluctance of most service stations to provide roadside assistance places these individuals in jeopardy.

I have invented a unique wheel assembly that cannot be overtightened, and that permits quick change of the tire-mounted wheel member thereof, even by the aged, the handicapped, the weakened, and the average female. Thereby, I have significantly advanced the state-of-the art.

SUMMARY OF THE INVENTION

My invention pertains to a demountable wheel assembly for a vehicle with a tire (not shown) mounted on the wheel member which, in its preferred embodiment, permits the very quick change and/or removal of the tire mounted wheel member from the axle-retained hub member by almost anyone, including the weak, the handicapped, the aged, and the average female. The assembly incorporates fundamental and unique features which include, but are not limited to: tapered nuts partially embedded in the wheel member; headless lug bolts; permanent magnets partially embedded in the axle-retained hub member; and, a brace-shaped driver to use in tightening and untightening the headless lug bolts.

Accordingly, the principal object of this invention is to teach the structure of my above-described novel wheel assembly, by providing a preferred embodiment thereof.

This principal object, as well as related objects, of this invention will become readily apparent after a consideration of the description of the invention, together with reference to the Figures of the drawings.

DESCRIPTION OF THE DRAWINGS

FIG. 2 is a perspective view, in simplified form, partially schematic and partially fragmented, of a representative extension of one of my unique nuts;

FIG. 3 is a perspective view, in simplified form, of a representative one of my novel headless bolts together with my specially structured bolt driver.

DESCRIPTION OF THE PREFERRED EMBODIMENT

Figure 1:
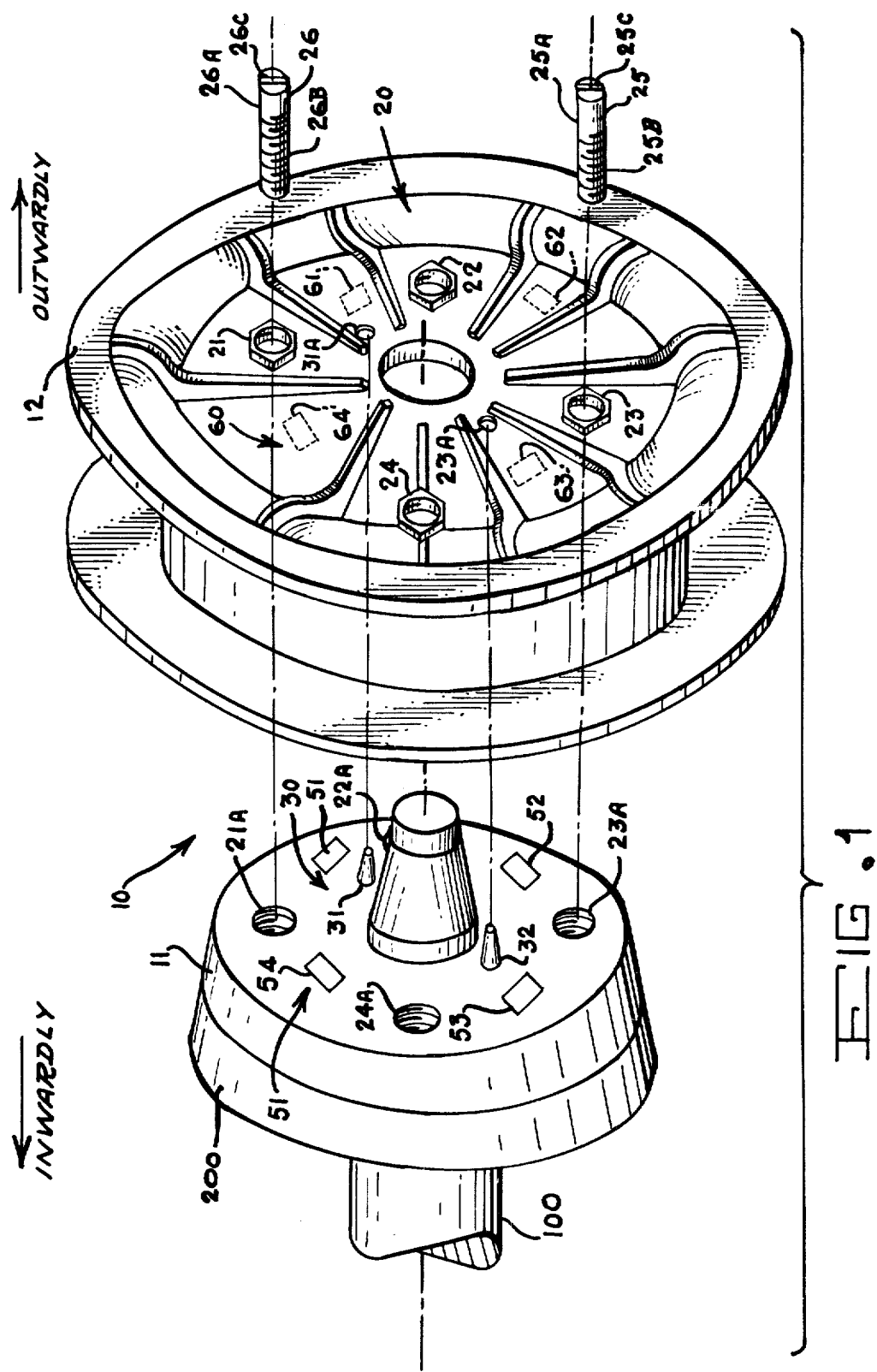
FIG. 1 is an exploded view of a preferred embodiment of my inventive wheel assembly, in perspective, partially schematic, and in simplified form, showing the invention in its working environment.
Figure 4:
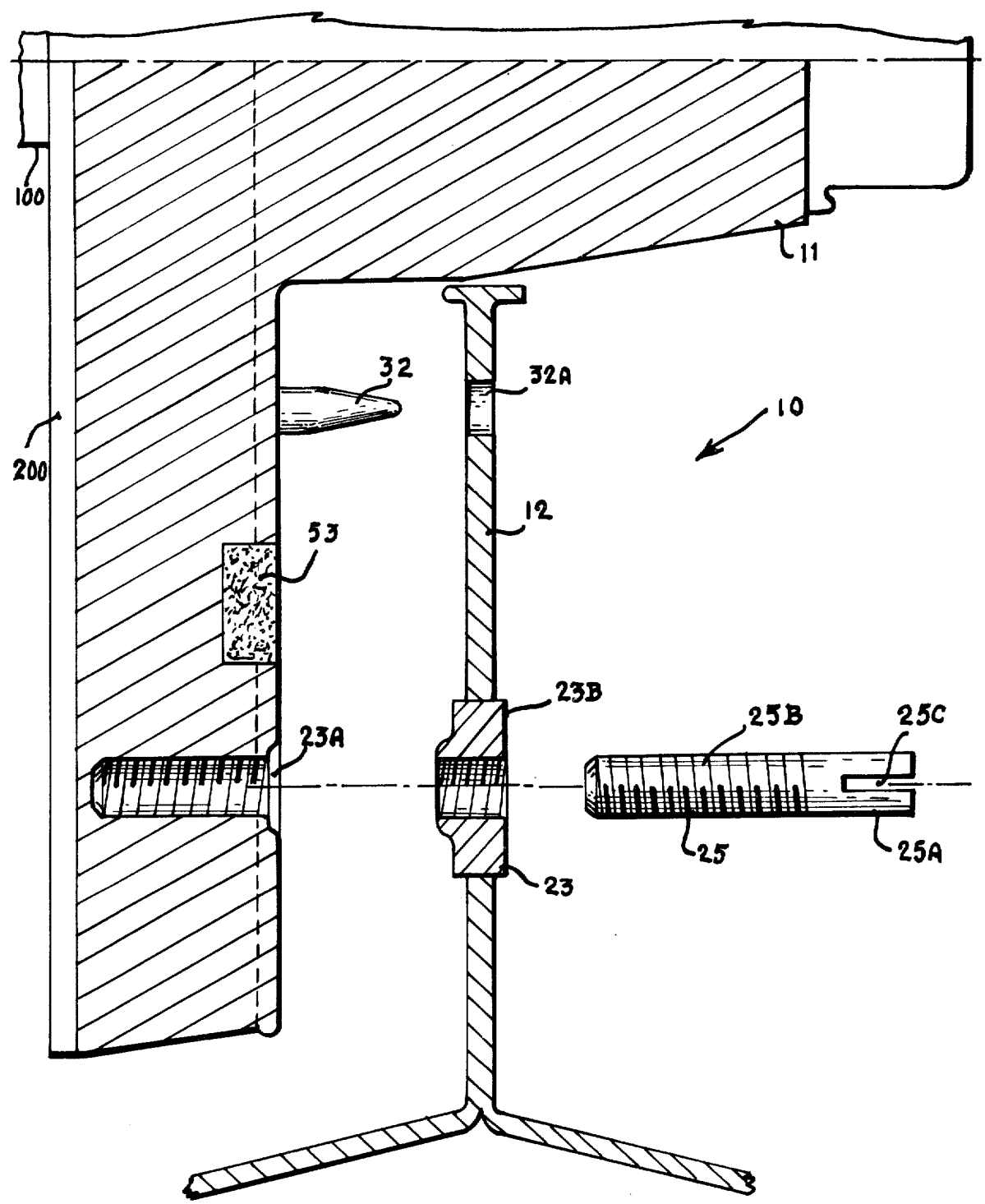
FIG. 4 is a perspective view, partially in cross section, partially fragmented, and partially in schematic form, of the lower portion of my wheel member, my hub member, and a representative one of my headless bolts.

With reference to FIGS. 1 and 4, therein is shown, in simplified form and in two views, the preferred embodiment 10 of my invention.

In the most basic and generic structural form, my inventive demountable wheel assembly 10, which is for use with an axle (such as 100, FIG. 1), comprises:

a. a wheel hub 11;

b. a wheel 12 that is configurated and is dimensioned to fit over and to complement with the wheel hub 11, with the wheel 12 fitted over, complementing, and abutting with the wheel hub 11;

c. and, means (generally designated 20) for releasably connecting the wheel 12 to the wheel hub 11, such that the wheel 12 can be and is releasably connected to the wheel hub, and where this means 20 includes:

(1) a plurality of tapered and threaded cavities (such as 21A-24A, inclusive, FIG. 1) in the wheel hub 11;

(2) a plurality of threaded nuts (such as 21-24, inclusive, FIG. 1) that are affixed to the wheel 12, with one nut for each one of the plurality of threaded cavities in the wheel hub 11, and with each nut partially embedded (i.e., with the top exposed) in the wheel 12, and also with each nut having affixed thereto an extension (such as representative ones 23B, FIG. 2 and FIG. 4) which is tapered and threaded complementarily to a corresponding cavity in the wheel hub 11, and also with each nut and its extension aligned with their corresponding cavity;

(3) and, a plurality of headless bolts (such as representative ones 25, FIG. 1 and FIG. 4), with each bolt having a first slotted end (such as 25A for representative headless bolt, FIG. 1) and a second tapered and threaded end (such as 25B for representative bolt 25, FIGS. 1 and 3), and with one headless bolt for each one of the plurality of threaded nuts 21-24, inclusive, FIG. 1, and its corresponding cavity 21A-24A, inclusive, FIG. 1, with the threaded second end of each bolt having threads that are complementary to the threads of its corresponding threaded nut, threaded nut extension, and threaded cavity. Of course, as will be explained later herein, each bolt threadedly engages its corresponding threaded nut, threaded nut extension, and threaded cavity when the wheel 11 is releasably connected to the wheel hub 12.

Still with reference to FIGS. 1 and 4, my demountable wheel assembly preferably also includes means, generally designated 30, for aligning the wheel hub 11 and the wheel 12 when releasably connecting them, so that each threaded nut with its threaded extension and its corresponding threaded cavity are in registration to permit driving of the appropriate headless bolt therethrough and therein. This aligning means 30 includes: a plurality of tapered guide pins (such as representative one 31 and 32, FIG. 1) that are affixed to, and project outwardly from, the wheel hub 11; and, a plurality of openings (such as representative ones 31A and 32A) in the wheel 12, with one corresponding opening for each one of the plurality of guide pins, and with each hole aligned with, and shaped and dimensioned to accept, its corresponding guide pin.

Now, with reference to FIG. 3, therein is shown representative headless bolt 25, and the means 40 for driving each one of the headless, slotted, threaded bolts, such as 25, into (and out of) threaded engagement with that bolt's corresponding threaded nut, threaded nut extention, and threaded cavity. As can be seen, the driving means 40 comprises a brace-shaped driver 41 having a driving end 42 that is configurated and dimensioned to fit over the first slotted end (such as 25A) of each volt (such as 25), and also having across the driving end 42 a ridge 43 that is complementarily shaped to fit into, and to engage with, the slot (such as 25C) of the slotted first end of each bolt.

With reference to FIGS. 1 and 4, my demountable wheel assembly 10 preferably also includes a first magnetic means, generally designated 50, for releasably holding the wheel 12 to the wheel hub 11 if the wheel 12 is made of magnetically attractable material (i.e., any material with extremely high magnetic perimeability which reacts strongly in a magnetic field, such as iron, steel, nickel, and the like). This first magnetic means 50 comprises a plurality of exposed permanent magnets, such as 51–54, inclusive, that are partially embedded in the wheel hub 11 and are disposed facing the inner side of the wheel.

If, however, the wheel 12 is made of a non-magnetic material (e.g., plastic, reinforced plastic, and the like), and the wheel-hub is made of a magnetically attractable material (as defined above) then, in that event, my wheel assembly 10 would not and does not include the first magnetic means 50, but rather includes a second magnetic means 60 for releasably holding the wheel 11 and the wheel hub 12 together. This means 60 comprises a plurality of exposed permanent magnets, such as 61–64, inclusive (shown in FIG. 1 in phantom), that are partially embedded in the wheel 12 and are disposed facing the wheel hub 11.

It is to be noted as a matter of preference, and not of limitation: that the plurality of tapered and threaded cavities 21A–24A, inclusive, FIG. 1, in the wheel hub 11 are four (4) in number; that the plurality of tapered guide pins 31 and 32, FIG. 1, are two (2) in number; that the brace-shaped driver 41, FIG. 3, has a short driving span "L" (i.e., driving arm or torque arm); that the plurality of magnets of the first magnetic means 51–54, inclusive, FIG. 1, if used, are four (4) in number; and, that the plurality of magnets of the second magnetic means 61–64, inclusive, FIG. 1, if used, are four (4) in number.

It is also to be noted and remembered that, although the wheel hub 11 is axle-retained, the means (such as 200, FIGS. 1 and 4) for retaining the hub 11 to the vehicular axle (such as 100, FIGS. 1 and 4) does not constitute a part of this invention; and, therefore, is not described or claimed.

MANNER OF OPERATION AND OF USE OF THE INVENTION

The manner of operation and of use of my inventive quick change wheel assembly 10 can be easily ascertained by any person of ordinary skill in the art from the foregoing description, coupled with reference to the FIGS. of the drawings.

For others, the following explanation is made:

Firstly, the wheel 12 with a tire (not shown) mounted on it is guided over and onto the axle-retained wheel hub 11 by use of the guide pins 31 and 32 and the corresponding complementary guide pin holes 31A and 32A, with the pins being inserted into their respective holes. As this is being done, the magnets (of either the first magnetic means 50, or of the second magnetic means 60, whichever means is appropriately used) draw and releasably hold the wheel and the wheel hub together, thereby freeing both hands.

Then, each of the plurality of headless bolts, such as 25 and 26, is manually inserted into its respective corresponding threaded nut, such as 23 for bolt 25 and 21 for bolt 26, and is driven into and through the respective corresponding threaded nut and threaded nut extension, such as 23 and 23B for bolt 25, and into its respective threaded cavity, such as 23A for bolt 25, by, and with the use of, the brace-shaped bolt driver 41, by engaging the slot in the first end of each bolt, such as slot 25C in first end 25A of bolt 25, with the complementarily configurated and dimensional ridge 43 at the driving end 42 of the bolt driver and rotating the driver 41, thereby seating each bolt in its respective cavity and releasably connecting the wheel to the axle-retained wheel hub. It is to be remembered that the driver 41 has a short span "L" to the drive handle that reduces the leverage that can be placed on the bolts and, thereby, overtightening of the bolts is prevented.

To remove the wheel 12 from the axle-retained wheel hub 11, the above sequence is reversed.

CONCLUSION

It is abundantly clear from all of the foregoing, and from the Figures of the drawings, that the desired principal object of the invention, as well as other related objects of the invention, have been achieved.

It is to be noted that, although there have been described and shown the fundamental and unique features of my invention as applied to a particular preferred embodiment, various other embodiments, variations, adaptations, substitutions, additions, omissions, and the like may occur to, and can be made by, those of ordinary skill in the art, without departing from the spirit of my invention. For example, in appropriate circumstances the first and second magnetic means may be used simultaneously, either in registration with each other (i.e, with first magnetic means 50 aligned with second magnetic means 60), or not.

What is claimed is:

1. A demountable wheel assembly, comprising:
   a. a wheel hub;
   b. a wheel configurated and dimensioned to fit over and to complement with said wheel hub, with said wheel fitted over, complementing, and abutting with said wheel hub;
   c. and, means for releasably connecting said wheel to said wheel hub, whereby said wheel is releasably connected to said wheel hub, and wherein said means includes:

(1) a plurality of tapered and threaded cavities in said wheel hub;

(2) a plurality of threaded nuts affixed to said wheel, with one nut for each one of said plurality of threaded cavities in said wheel hub, wherein each said nut is partially embedded in said wheel, and wherein each said nut has affixed thereto an extension which is tapered and threaded complementarily to a corresponding cavity of said plurality of tapered and threaded cavities in said wheel hub, and wherein each said nut and its extension are in alignment with their said corresponding cavity;

(3) and, a plurality of headless bolts, with each bolt having a first slotted end and a second tapered and threaded end, and with one bolt for each one of said plurality of threaded nuts and its corresponding cavity, wherein said threaded second end of each said bolt has threads complementary to said threads of its corresponding threaded nut, threaded nut extension, and threaded cavity, and wherein each said bolt is threadly engaged with its corresponding threaded nut, threaded nut extension, and threaded cavity.

2. A demountable wheel assembly, as set forth in claim 1, wherein said wheel assembly further includes means for aligning said wheel hub and said wheel, whereby when said wheel hub and said wheel are releasably connected, each said threaded nut with its threaded extension and its corresponding threaded cavity are in registration, and wherein said aligning means includes:
 a. a plurality of tapered guide pins affixed to and projecting from said wheel hub;
 b. and, a plurality of openings in said wheel, with one corresponding opening for each one of said plurality of guide pins, wherein each hole is aligned with and accepts its corresponding guide pin, and said guide pin is fitted into said hole.

3. A demountable wheel assembly, as set forth in claim 2, wherein said wheel assembly further includes means for driving each one of said headless, slotted, threaded bolts into threaded engagement with its corresponding threaded nut, threaded nut extension, and threaded cavity, with said driving means comprising a brace-shaped driver having a driving end configurated and dimensioned to fit over said first slotted end of each said bolt and also having across said driving end a ridge conplementarily shaped to fit into, and to engage with, said slot of said slotted first end of each said bolt.

4. A demountable wheel assembly, as set forth in claim 3, wherein said wheel is made of a magnetically attractable material, and wherein said wheel assembly further includes a first magnetic means for releasably holding said wheel and said hub together, with said magnetic means comprising a plurality of exposed permanent magnets partially embedded in said wheel hub and disposed facing said wheel.

5. A demountable wheel assembly, as set forth in claim 3, wherein said wheel hub is made of magnetically attractable material and said wheel is made of non-magnetic material, and wherein said wheel assembly further includes a second magnetic means for releasably holding said wheel and said hub together, with said this said magnetic means comprising a plurality of exposed permanent magnets partially embedded in said wheel and disposed facing said wheel hub.

6. A demountable wheel assembly, as set forth in claim 4, wherein:
 a. said plurality of tapered and threaded cavities in said wheel hub are four in number;
 b. said plurality of tapered guide pins are two in number;
 c. said brace-shaped driver has a short driving span;
 d. and, said plurality of magnets of said first magnetic means are four in number.

* * * * *